United States Patent [19]
Schaller et al.

[11] Patent Number: 6,166,454
[45] Date of Patent: Dec. 26, 2000

[54] BATTERY DISCONNECTION SYSTEM

[75] Inventors: Thomas Schaller; Jens Brake, both of Wuppertal; Jurgen Dinger, Remscheid, all of Germany

[73] Assignee: Delphi Technologies, Inc., Troy, Mich.

[21] Appl. No.: 09/404,514

[22] Filed: Sep. 23, 1999

[30] Foreign Application Priority Data

Sep. 24, 1998 [GB] United Kingdom ............... 9820731
May 27, 1999 [GB] United Kingdom ............... 9912258

[51] Int. Cl.$^7$ .................................................. B60L 1/00
[52] U.S. Cl. ........................ 307/10.1; 307/10.7; 307/9.1
[58] Field of Search ..................... 340/636; 200/61.5; 307/10.1, 10.7, 9.1; 180/284, 287, 271–274

[56] References Cited

U.S. PATENT DOCUMENTS

| | | | |
|---|---|---|---|
| 3,022,932 | 2/1962 | Clemson | 200/61.5 |
| 5,038,006 | 8/1991 | Lowe, Sr. et al. | 200/61.5 |
| 5,170,151 | 12/1992 | Hochstein | 340/636 |

*Primary Examiner*—Stephen W. Jackson
*Assistant Examiner*—Sharon Polk
*Attorney, Agent, or Firm*—Richard A. Jones

[57] ABSTRACT

A battery disconnection system (10) for a motor vehicle comprising a rod (12) having a longitudinal axis (A), an external threaded surface (14) extending from one end and a cylindrical member (16) extending coaxially with the rod (12), from the other end. Reversible drive means (20,22,24) engage the threaded surface (14). A first annular member (30) coaxial and in sliding contact with the cylindrical member (16). A second annular member (32) coaxial and in sliding contact with the cylidrical member (16). Either annular member being connectable with a motor vehicle battery. The other annular member being connectable with a starter motor and/or a generator (38) of a motor vehicle. The reversible drive means (20,22,24) moves the rod (12) in a longitudinal direction (X) between a first position in which the cylindrical member (16) engages and electrically connects the annular members (30,32) for normal operation of the motor vehicle, and a second position in which the cylindrical member (16) is disengaged from one of the annular members (30,32) during sensed adverse conditions such as a vehicle crash.

8 Claims, 3 Drawing Sheets

BATTERY DISCONNECTION SYSTEM

TECHNICAL FIELD

The present invention relates to a battery disconnection system for use with a battery in a motor vehicle.

BACKGROUND OF THE INVENTION

There is a need to provide a battery disconnection system which can operate automatically to disconnect the power supply from the battery to certain electrical loads in a motor vehicle.

SUMMARY OF THE INVENTION

The object of the invention is to provide a battery disconnection system which can automatically and quickly disconnect the power supply from the battery when a predetermined operating condition of the vehicle is sensed. The system can be easily reversed to restore power to the electrical loads. The system (10) can be mounted directly to the vehicle battery.

The system includes a rod (12) having a longitudinal axis (A), an external threaded surface (14) extending from one end and a cylindrical member (16) extending coaxially with the rod ( 12), from the other end. Reversible drive means (20,22,24) engage the threaded surface (14). A first annular member (30) coaxial and in sliding contact with the cylindrical member (16). A second annular member (32) coaxial and in sliding contact with the cylidrical member (16). Either annular member being connectable with a motor vehicle battery. The other annular member being connectable with a starter motor and/or a Generator (38) of a motor vehicle. The reversible drive means (20,22,24) moves the rod (12) in a longitudinal direction (X) between a first position in which the cylindrical member (16) engages and electrically connects the annular members (30,32) for normal operation of the motor vehicle and a second position in which the cylindrical member (16) is disengaged from one of the annular members (30,32) during sensed adverse conditions such as a vehicle crash. The system can also be configured to include a third annular member (34) coaxial and in slidng contact with the cylindrical member ( 16) for connection to the battery during low battery conditions useful for jump starting a motor vehicle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
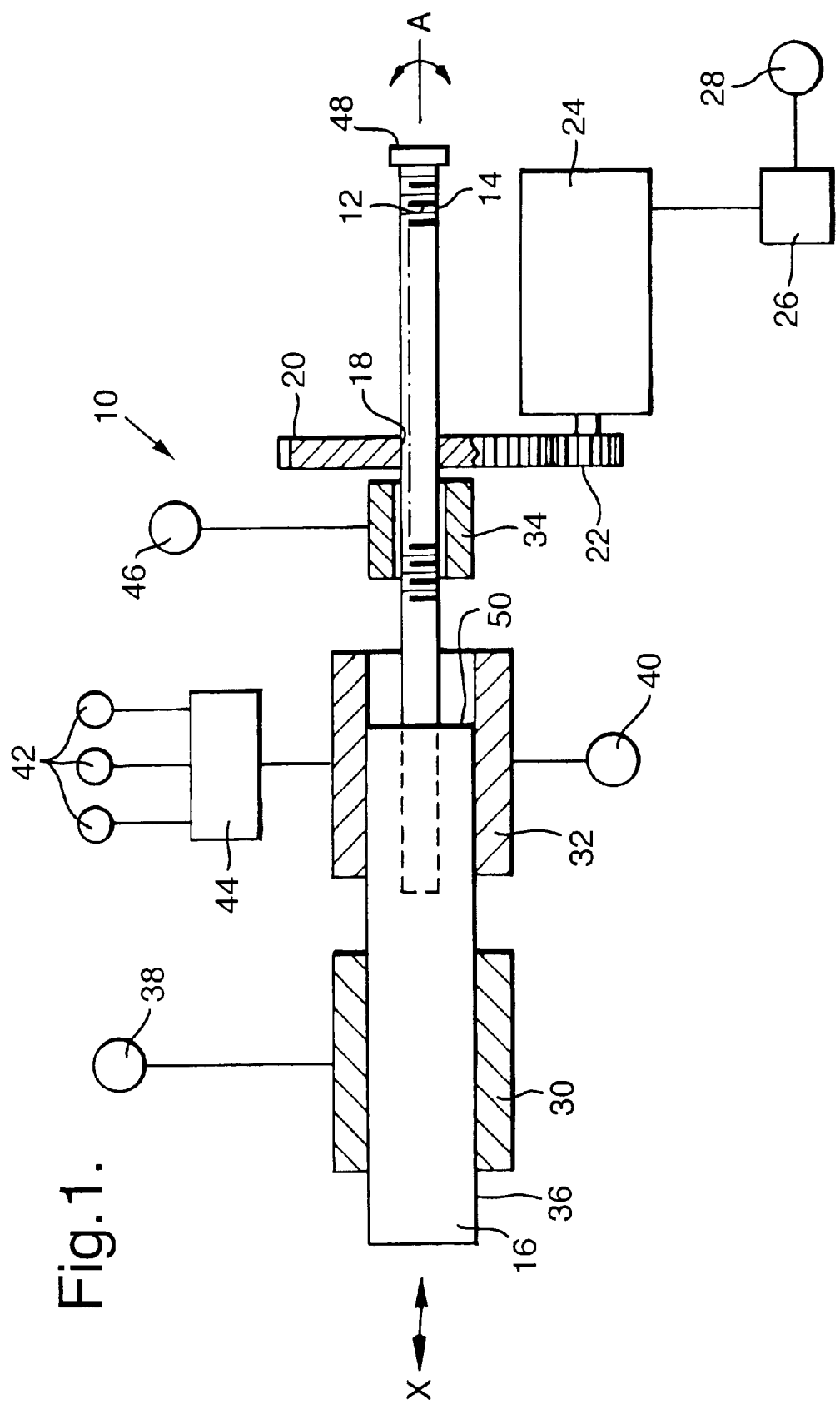
FIG. 1 is a schematic cross-sectional view of a first embodiment of battery disconnection system in accordance with the present invention.

Referring to FIG. 1, the first embodiment of battery disconnection system 10 comprises a rod 12 which has a longitudinal axis A, and which has an external threaded surface 14 along at least part of its length; and a cylindrical member 16 integral with, and axially aligned with, the rod. A pinion 20 has an internal threaded surface 18 in threaded engagement with the threaded surface 14 of the rod 12 and external teeth in engagement with a gear 22 which can be rotatably driven by a reversible electric motor 24. Operation of the electric motor 24 is controlled by a control unit 26, which actuates the motor dependent on signals from one or more sensors 28. Actuation of the electric motor 24 causes the pinion 20 to rotate about axis A, thereby causing the rod 12 and the cylindrical member 16 to move in the longitudinal direction X, the actual direction being dependent on the direction of rotation of the electric motor.

The disconnection system 10 further comprises first, second and third annular members 30,32,34 respectively. The first annular member 30 is positioned around the cylindrical member 16 and engages the external surface 36 of the cylindrical member. The second annular member 32 is normally positioned around the cylindrical member 16 and engages the external surface 36 of the cylindrical member. The third annular member 34 is positioned adjacent the pinion 20 around (and normally radially spaced from the threaded portion 14 of) the rod 12. The second annular member 32 is positioned between the first annular member 30 and the third annular member 34, with the annular members coaxial on axis A.

The first annular member 30 is electrically connectable to the starter motor and/or generator 38 of the motor vehicle. The second annular member 32 is electrically connectable to a terminal 40 of the vehicle battery (not shown), and to electrical loads 42 in the vehicle by way of a fuse system 44. The third annular member 34 is electrically connectable to a jump start terminal 46. The annular members 30,32,34 and the cylindrical member 16 are formed from electrically conducting material. The first annular member 30 usually remains in engagement with the cylindrical member 16.

During normal operation of the motor vehicle, the battery disconnection system 10 is arranged as shown in FIG. 1. In this position, the battery terminal 40 is electrically connectable with the starter motor and/or generator 38 (by way of the cylindrical member 16) and with the electrical loads 42.

If an adverse operating condition (or any other predetermined operating condition) is sensed by the sensor(s) 28, for example, a vehicle crash, the electric motor 24 is operated to move the rod 12 and cylindrical member 16 towards the left (as shown in FIG. 1) to disengage the cylindrical member 16 from the second annular member 32. In this position, the starter motor and/or generator 38 is electrically disconnected from the battery terminal 40. A stop member 48 on the end of the rod 12 remote from the cylindrical member 16 can engage the pinion 20 to restrict movement of the rod in the leftward direction to prevent the rod from becoming disengaged from the pinion, and to substantially prevent rotation of the rod about its longitudinal axis A.

If the vehicle battery loses power (goes flat), the electric motor 24 can be operated, or the pinion 20 can be rotated manually, to move the rod 12 and the cylindrical member 16 towards the right (as shown in FIG. 1) to bring the end face 50 of the cylindrical member (or an adjacent enlarged portion of the rod, not shown) into engagement with the third annular member 34. In this position, the jump start terminal 46 is electrically connected with the battery terminal 40, and the starter motor and/or generator 38, by way of the cylindrical member 16.

Figure 2:
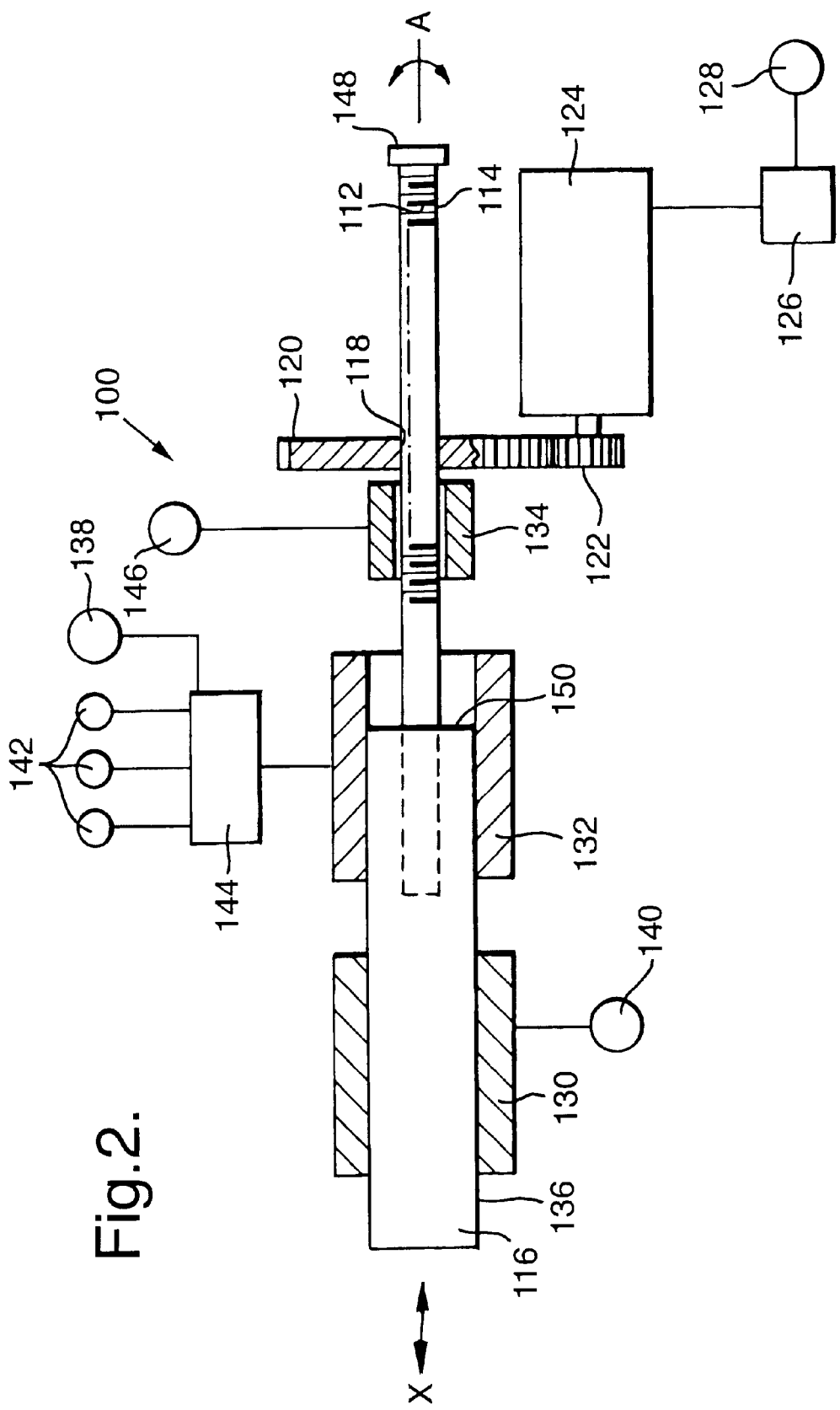
FIG. 2 is a schematic cross-sectional view of a second embodiment of battery disconnection system in accordance with the present invention.

Referring to FIG. 2, the second embodiment of battery disconnection system 100 is substantially the same as the first embodiment with like parts being given the prefix 100. In this second embodiment, the battery terminal 140 is electrically connectable to the first annular member 130, and the starter motor and/or generator 138 is electrically connectable to the second annular member 132 either by way of the fuse system 144, as shown, or directly.

During normal operation of the motor vehicle, the battery disconnection system 100 is arranged as shown in FIG. 2. In this position, the battery terminal 140 is electrically connectable with the starter motor and/or generator 138 and with the electrical loads 142 by way of the cylindrical member 116.

If an adverse operating condition (or any other predetermined operating condition) is sensed by the sensor(s) 128, for example, a vehicle crash, the electric motor 124 is operated to move the rod 112 and the cylindrical member 116 towards the left (as shown in FIG. 2) to disengage the cylindrical member from the second annular member 132. In this position, the starter motor and/or generator 138 and the electrical loads 142 are electrically disconnected from the battery terminal 140. The stop member 148 limits leftward movement of the rod 112, and substantially prevents rotation of the rod about its longitudinal axis A.

Similarly, for transportation of the motor vehicle before normal use or during servicing of the motor vehicle, the electric motor 124 can be operated, or the pinion 120 can be rotated manually, to move the rod 112 and the cylindrical member 116 towards the left (as shown in FIG. 2) to disengage the cylindrical member from the second annular member 132. Again, in this position, the starter motor and/or generator 138 and the electrical loads 142 are electrically disconnected from the battery terminal 140. Again, the stop member 148 limits leftward movement of the rod 112, and substantially prevents rotation of the rod about its longitudinal axis A.

If the vehicle battery loses power (goes flat), the electric motor 124 can be operated, or the pinion 120 can be rotated manually, to move the rod 112 and the cylindrical member 116 towards the right (as shown in FIG. 2) to bring the end face 150 of the cylindrical member (or an adjacent enlarged portion of the rod, not shown) into engagement with the third annular member 134. In this position, the jump start terminal 146 is electrically connected with the battery terminal 140, and the starter motor and/or generator 138, by way of the cylindrical member 116.

Figure 3:
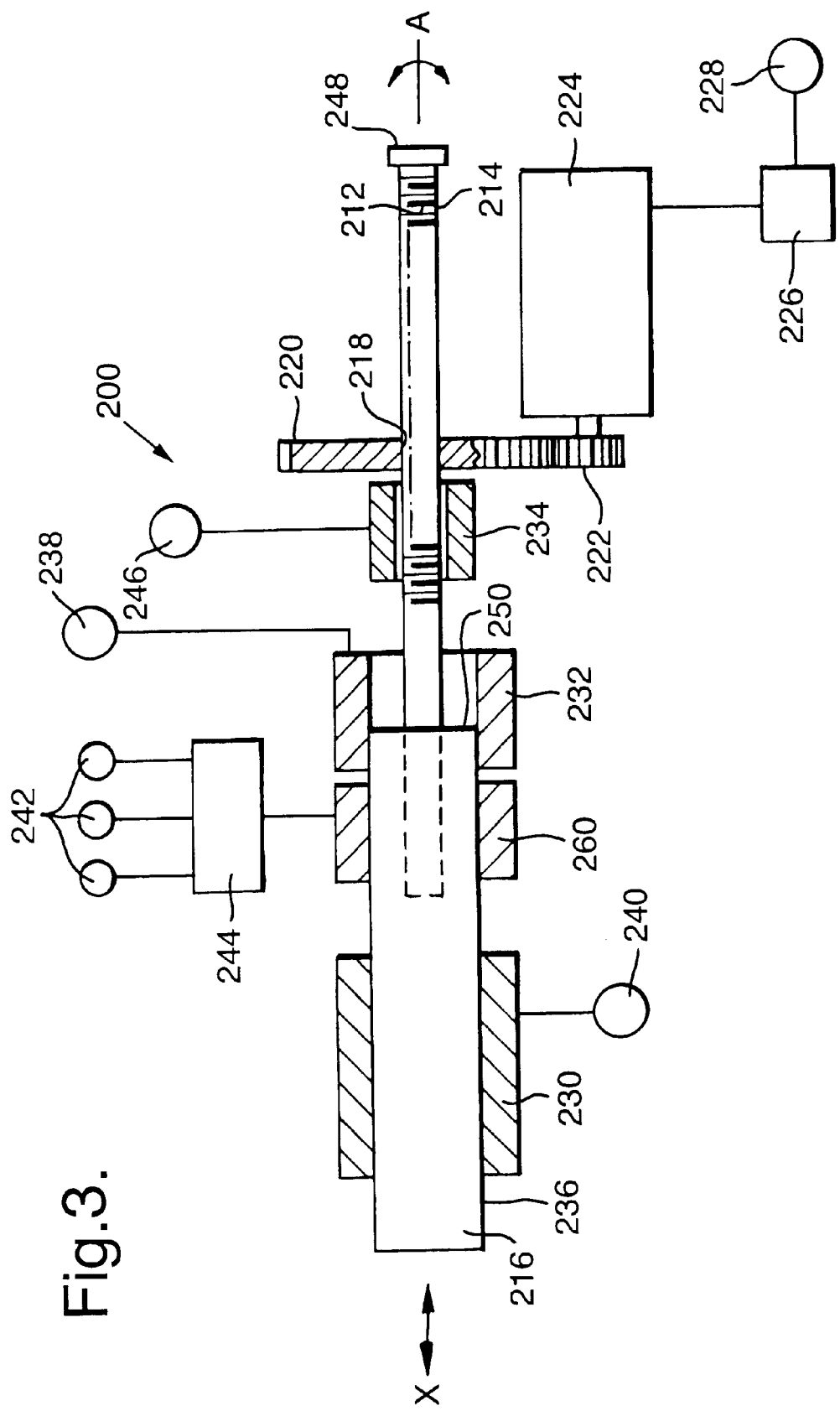
FIG. 3 is a schematic cross-sectional view of a third embodiment of battery disconnection system in accordance with the present invention.

Referring to FIG. 3, the third embodiment of battery disconnection system 200 is substantially the same as the second embodiment with like parts being given the prefix 200. In this third embodiment, the fuse system 244 and electrical loads 242 are electrically connected to a fourth annular member 260 positioned between the first and second annular members 230,232. The fourth annular member 260 is engageable with the outer surface 236 of the cylindrical member 216. The starter motor and/or generator 238 are electrically connectable to the second annular member 232. This third embodiment can provide electrical disconnection of the battery terminal 240 from the starter motor and/or generator 238, but leave electrical connection of the battery terminal with the electrical loads 242, during a sensed adverse vehicle condition, by restricting the amount of movement towards the left of the rod 212 and cylindrical member 216. That is, during a sensed adverse vehicle condition, the cylindrical member 216 disengages from the second annular member 232 but remains in engagement with the fourth annular member 260. Whereas during transportation or servicing, the cylindrical member 216 is move to be disengaged from both the second and fourth annular members 232,260.

The battery disconnection systems 10,100,200 described above may be mounted directly on the vehicle battery. The fuse system 44,144,244 may be an integral part of the disconnection system. One or more of the annular members 30,32,34,130,132,134,230,232,234,260 may include a portion which is stamped and folded from sheet metal to include an integral terminal for crimping or soldering, as required.

The present invention provides a battery disconnection system which can automatically and quickly disconnect the power supply from the battery to certain electrical loads when a predetermined operating condition of the vehicle is sensed. The disconnection operation can be easily reversed to restore power to the electrical loads. The system is easy to assemble, using only a single electric motor, and can be adapted to disconnect power under numerous conditions. The system can be adapted, as indicated in the above embodiments, to also provide a electrical connection between the electrical loads and the battery terminal when jump starting is required.

What is claimed is:

1. A battery disconnection system for a motor vehicle having a battery, a starter motor, and a generator, the system comprising a rod having a longitudinal axis, an external screw threaded surface extending from one end, and a cylindrical member extending from the other end and coaxial with the rod; reversible drive means engaging the threaded surface of the rod; a first annular member coaxial with the cylindrical member and in sliding contact with the external surface of the cylindrical member; a second annular member coaxial with the cylindrical member and slidably engageable with the external surface of the cylindrical member; one of the first annular member or the second annular member being electrically connectable with the battery; the other of the first annular member or the second annular member being electrically connectable with the starter motor and/or the generator; the rod being movable in a longitudinal direction by the reversible drive means between a first position in which the cylindrical member engages and electrically connects the first annular member and the second annular member, and a second position in which the cylindrical member is disengaged from the second annular member.

2. A system as claimed in claim 1, further comprising a third annular member coaxial with the rod, normally positioned around the threaded portion thereof, and connectable with the cylindrical member; the second annular member being positioned between the first annular member and the third annular member; the third annular member being electrically connectable with a jump start terminal; wherein in the first and second positions of the rod, the cylindrical member is disconnected from the third annular member; and wherein the rod is movable to a third position by the reversible drive means in which the cylindrical member electrically connects with the first, second and third annular members.

3. A system as claimed in claim 1 or claim 2, wherein the rod is movable from the first position to the second position on sensing of a predetermined vehicle operating condition by a sensor connected to a control unit which operates the reversible drive means.

4. A system as claimed in claim 1, wherein the reversible drive means comprises a pinion and a reversible electric motor, the pinion having teeth in threaded engagement with the threaded surface on the rod.

5. A system as claimed in claim 1, wherein the rod has a stop member which limits longitudinal movement of the rod relative to the first annular member and which substantially prevents rotation of the rod about its longitudinal axis.

6. A system as claimed in claim 1, wherein the first annular member is electrically connectable to the starter motor and/or generator, the second annular member is electrically connectable to the battery, and the second annular member is electrically connectable to other electrical loads in the motor vehicle.

7. A system as claimed in claim 1, wherein the first annular member is electrically connectable to the battery, the second annular member is electrically connectable to the starter motor and/or generator, and the second annular member is electrically connectable to other electrical loads in the motor vehicle.

8. A system as claimed in claim 3, further comprising a fourth annular member positioned between the first and second annular members, coaxial with the cylindrical member, and slidably engageable with the external surface of the cylindrical member; wherein the first annular member is electrically connectable to the battery, the second annular member is electrically connectable to the starter motor and/or generator, and the fourth annular member is electrically connectable to other electrical loads in the motor vehicle; wherein in the first and second positions of the rod, the cylindrical member engages and electrically connects with the fourth annular member; and wherein the rod is movable to an additional position by the reversible drive means in which the cylindrical member is disengaged from the second and fourth annular members.

* * * * *